United States Patent [19]

Su et al.

[11] Patent Number: 4,585,817

[45] Date of Patent: Apr. 29, 1986

[54] CRYSTALLIZABLE POLYOLEFIN COMPOSITION HAVING INCREASED CRYSTALLIZATION TEMPERATURE AND RATE OF CRYSTALLIZATION

[75] Inventors: Tien-Kuei Su, Pittsford; Norman R. Youngjohn, Macedon, both of N.Y.

[73] Assignee: Mobil Oil Corporation, New York, N.Y.

[21] Appl. No.: 619,511

[22] Filed: Jun. 11, 1984

[51] Int. Cl.[4] .............................................. C08K 5/06
[52] U.S. Cl. .................................... 524/108; 524/141
[58] Field of Search ................ 525/240; 524/108, 141

[56] References Cited

U.S. PATENT DOCUMENTS

| | | | |
|---|---|---|---|
| 3,359,346 | 12/1967 | Takashima et al. | 260/897 |
| 3,367,926 | 2/1968 | Voeks . | |
| 4,016,118 | 4/1977 | Hamada et al. | 524/108 |
| 4,258,142 | 3/1981 | Ohzeki et al. | 428/339 X |
| 4,388,119 | 6/1983 | Uchiyama | 524/108 X |
| 4,410,582 | 10/1983 | Tsunashima et al. | 428/323 X |
| 4,410,649 | 10/1983 | Cieloszyk | 524/108 |
| 4,415,711 | 11/1983 | Jones | 526/88 |
| 4,419,473 | 12/1983 | Mahaffey, Jr. | 524/388 X |
| 4,434,264 | 2/1984 | Ficker | 524/396 X |
| 4,439,567 | 3/1984 | Inoue et al. | 524/108 |
| 4,460,445 | 7/1984 | Rekers | 524/369 X |

FOREIGN PATENT DOCUMENTS 53-132049 11/1978 Japan .................................. 524/108

*Primary Examiner*—Paul R. Michl
*Attorney, Agent, or Firm*—Alexander J. McKillop; Michael G. Gilman; Edward J. Trojnar

[57] ABSTRACT

Linear low density polyethylene and copolymers of ethylene with at least one alpha-olefin containing 3–8 carbon atoms having increased temperature of crystallization and rate of crystallization are prepared by incorporating a proportion of highly isotactic polypropylene therein with the nucleating compound dibenzylidene sorbitol or phenyl phosphate compound.

9 Claims, 1 Drawing Figure

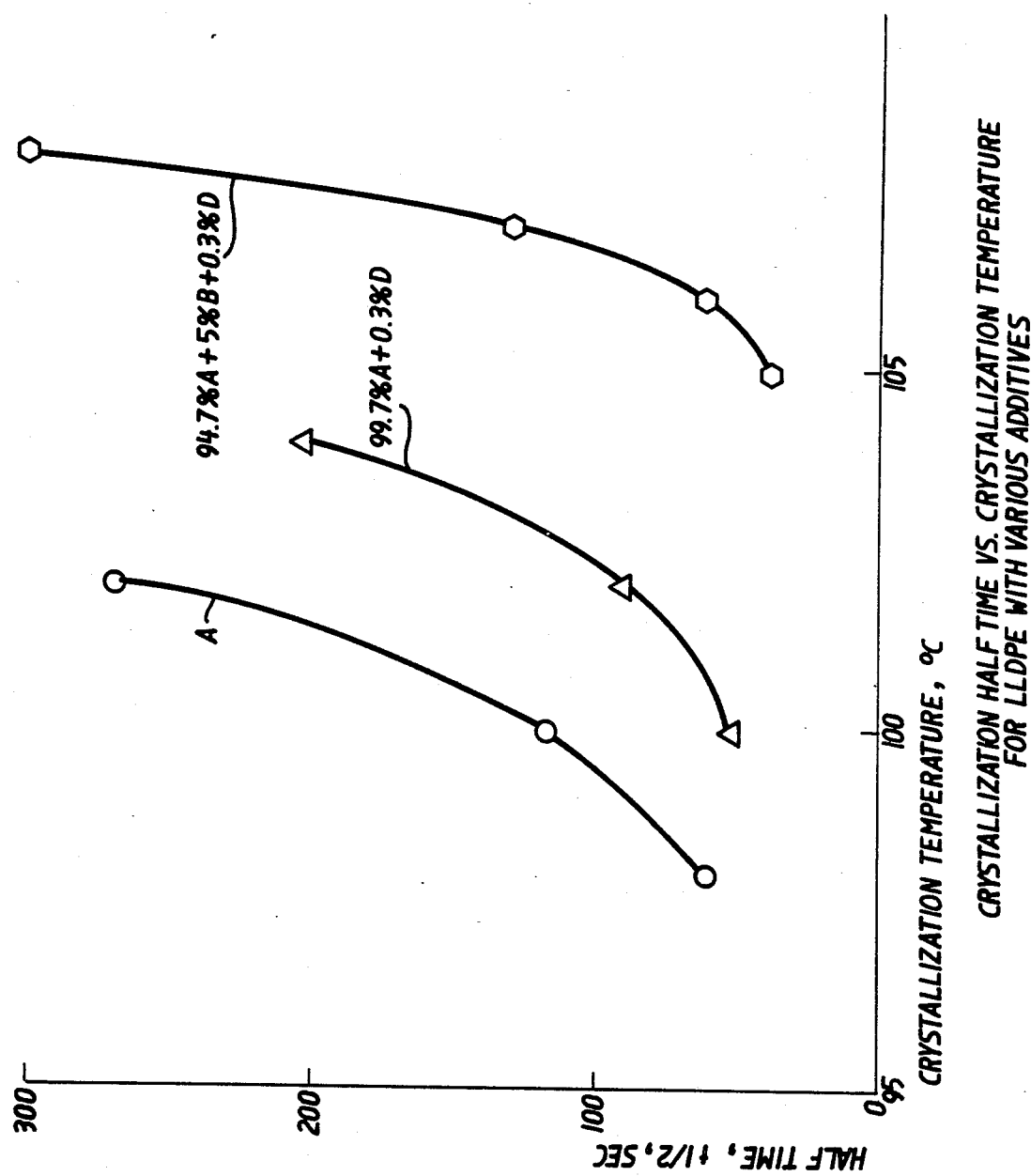

CRYSTALLIZABLE POLYOLEFIN COMPOSITION HAVING INCREASED CRYSTALLIZATION TEMPERATURE AND RATE OF CRYSTALLIZATION

BACKGROUND OF THE INVENTION

The present invention relates to crystallizable polyolefin polymers, and more particularly to linear low density polyethylene and copolymers of ethylene with alpha-olefins having 3 to 8 carbons containing a novel nucleating composition, whereupon cooling from a molten state, the temperature of crystallization and rate of crystallization are significantly increased.

The use of nucleating agents to modify the crystalline structure of thermoplastic high polymers and to increase the temperature of crystallization and rate of crystallization is well known in the art and is discussed in detail, for example, in U.S. Pat. No. 3,367,926 to John F. Voeks, the disclosure of which is incorporated herein by reference in its entirety. The above-described polymer composition, while in the heat-plastified state, can be fabricated into various articles, such as fibers, filaments, films, tubes or the like, by extrusion or molded by compression or injection or otherwise into molded articles and then cooled to "set up" the shape and induce crystallization. By increasing the temperature of crystallization and rate of crystallization, the cycle time can be reduced and production rates increased.

BRIEF DESCRIPTION OF THE INVENTION

The present invention is based upon the discovery that the affect of certain known nucleating compounds on increasing the crystallization temperature and rate of crystallization of the herein defined polymers can be significantly enhanced by incorporating in the polymer with said known nucleating compound, a proportion of high isotactic polypropylene. This is particularly surprising since the polypropylene, itself, has been found to have hardly any effect on the crystallization temperature or rate.

DETAILED DESCRIPTION OF THE INVENTION

As indicated above, the polymers of the present invention are linear low density polyethylene or copolymers of ethylene with at least one alpha-olefin having 3 to 8 carbon atoms. By the term linear low density polyethylene there is meant polyethylene having a density of about 0.91 to about 0.93 gm/ml. The copolymers are those having a preponderance of ethylene units and a melt index of about 0.5 to about 50. The alpha olefins include straight chain and branched chain olefins containing 3-8 carbon atoms and include propylene, butene, 3-methylbutene-1, 4-methyl-pentene-1, octene and the like.

The polypropylene additive, also hereinafter termed co-nucleating agent, utilized herein has a melt index of about 1 to 25 and a high iosotactic content of at least about 95%.

The nucleating compound, used in conjuction with the polypropylene according to the present invention, is selected from the group consisting of certain phenyl phosphate compounds and dibenzylidene sorbitol. The phenyl phosphate compounds are described in detail in U.S. Pat. No. 4,258,142 in the name of Toshio Ohzeki, the disclosure of which patent is incorporated herein by reference in its entirety. These compounds will be described further hereinafter. The use of dibenzylidene sorbitol as an additive in polyolefin compositions is described in U.S. Pat. No. 4,016,118 in the name of Kenzo Hamada et al, which is also incorporated herein by reference in its entirety.

As there disclosed, the dibenzylidene sorbitol is prepared by reacting 1 mol of sorbitol and 2 mols of benzaldehyde in the presence of an acid catalyst at an elevated temperature.

In preparing the herein disclosed polymer composition of increased crystallization temperature and increased rate of crystallization, the nucleating compound and the polypropylene co-nucleating agent are incorporated into the molten resin by conventional procedures, such as by using a Brabender Mixer under an inert atmosphere. The polypropylene is utilized in an amount from about 0.1 to about 20% by weight, preferably from about 0.5 to about 5% by weight, when used with dibenzylidene sorbitol or the phenyl phospate compound. The dibenzylidene sorbitol is used in an amount from about 0.05 to about 1.5% by weight, preferably 0.1 to about 0.5%. When utilizing the phenyl phosphate compound as the nucleating compound, it is used in an amount from about 0.05 to about 2% by weight, preferably from about 0.1 to about 1% by weight. All percentages are based on the weight of the total composition.

As described in the above-referred to Ohzeki patent, the phenyl phosphate compounds utilized herein have the formula:

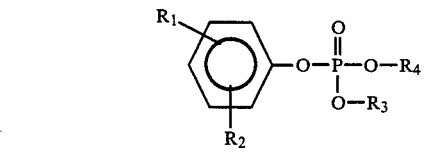

in which $R_1$ and $R_2$ are independently selected from the group consisting of a hydrogen atom, an alkyl group having 1 to 18 carbon atoms, an alkoxy group having 1 to 18 carbon atoms, a cycloalkyl group having 5 to 12 carbon atoms, a phenyl group, a phenoxy group, and a group

in which $R_5$ is a hydrogen atom or an alkyl group having 1 to 18 carbon atoms; $R_3$ is selected from the group consisting of an alkyl group having 1 to 18 carbon atoms,

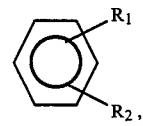

and $R_4$; and $R_4$ is a hydrogen atom or a metal atom equivalent $M_{1/a}$ where a is the valence of the metal atom M.

As indicated in the Ohzeki patent, the preferred phenyl phosphate compounds are the metal salts of diphenyl phosphates, and particularly preferred are the calcium, magnesium, potassium and sodium salts of di(p-t-butylphenyl) phosphate.

In order to further illustrate the present invention, the following examples are provided. They in no way are intended to limit the scope of the invention.

EXAMPLES 1-15

The materials used according to the present invention, and used in these examples are shown in Table 1 and identified by designated symbol A, B, C and D.

The additives were incorporated into the linear low density polyethylene resin by melt compounding using a Brabender Mixer at 210° C. for 5 minutes under a nitrogen atmosphere. Test specimens were prepared using hot press at a temperature of 180° C. under a pressure of 20,000 psi and allowed to cool to room temperature. The crystallization temperature and rate of crystallization were measured using a Differential Scanning Calorimeter (DSC-2) from Perkin-Elmer. The effect of the additives with various formulations on the crystallization temperature is presented in Tables 2 and 3.

TABLE 1

| Designated Symbol | Chemical | Specification |
| --- | --- | --- |
| A | Linear Low Density Polyethylene | $MI^{(1)} = 2, d^{(2)} = 0.9204$ g/cc |
| B | 97% Isotactic Polypropylene (PP) | $MI^{(1)} = 4.5, d^{(2)} = 0.9100$ g/cc |
| C | Phenyl Phosphate Compound$^{(a)}$ | White Powder, d = 1.24 g/cc |
| D | Dibenzylidene Sorbtoil$^{(b)}$ | White Powder, d = 1.047 g/cc |

$^{(1)}$ MI: Melt Index measured by ASTM 1238.
$^{(2)}$ d: Density measured by ASTM D1505.
$^{(a)}$ Sodium di(p-tert-butylphenyl) phosphate supplied by Argus Chemical Division of Witco Chemical Corporation, under the registered trademark Mark 2180.
$^{(b)}$ Supplied by Milliken & Co. under the registered trademark MILLARD 3905.

TABLE 2

| Example # | Material | Crystallization Temperature (°C.) | |
| --- | --- | --- | --- |
| | | $Tc,i^{(1)}$ | $Tc,p^{(2)}$ |
| 1 | A | 101 | 97 |
| 2 | 99.7% A + 0.3% D | 104 | 99 |
| 3 | 99% A + 1% B | 101 | 97 |
| 4 | 98.7% A + 1% B + 0.3% D | 107 | 104 |
| 5 | 97.5% A + 2.5% B | 101 | 97 |
| 6 | 97.2% A + 2.5% B + 0.3% D | 107 | 104 |
| 6a | 97.45% A + 2.5% B + 0.5% D | | |
| 6b | 96.5% A + 2.5% B + 1% D | | |
| 7 | 95% A + 5% B | 101 | 97 |
| 8 | 94.7% A + 5% B + 0.3% D | 110 | 106 |
| 9 | 79.7% A + 20% B + 0.3% D | | |

$^{(1)}$Tc,i: Initial Crystallization Temperature
$^{(2)}$Tc,p: Peak Crystallization Temperature

TABLE 3

| Example # | Material | Crystallization Temperature (°C.) | |
| --- | --- | --- | --- |
| | | $Tc,i^{(1)}$ | $Tc,p^{(2)}$ |
| 10 | A | 101 | 97 |
| 11 | 99.7% A + 0.3% C. | 105 | 101 |
| 12 | 95% A + 5% B | 101 | 97 |
| 13 | 94.7% A + 5% B + 0.3% C | 107 | 103 |
| 14 | 94.95% A + 5% B + 0.05% C | | |
| 15 | 94% A + 5% B + 1% C | | |

From the above, it is seen that the addition of polypropylene has hardly any effect on the crystallization temperature of the linear low density polyethylene. By incorporating the nucleating compound benzylidene sorbitol or the phenyl phosphate compound, Example 2 in Table 2 and Example 11 in Table 3, respectively, it is seen that the crystallization temperature has been raised to some degree. However, by incorporating both the nucleating compound and polypropylene into the polymer, it is seen that the crystallization temperature has been increased significantly. In Table 2, comparing Example 4 with Example 3 and Example 6 with Examples 5 and 2, Example 8 with Example 7, the unexpected effect is clearly demonstrated. Likewise, comparing Example 13 to Examples 11 and 12 in Table 3, the unexpected enhancement of crystallization is also readily seen.

BRIEF DESCRIPTION OF THE DRAWING

The single drawing figure is a graph illustrating increase in crystallization rate brought about by the present invention, where the curve to the left represents linear low density polyethylene, the middle curve represents linear low density polyethylene containing dibenzylidene sorbitol and the curve to the right indicates the linear low density polyethylene containing dibenzylidene sorbitol and polypropylene. The above-referred to designated symbols are indicated.

The effect of the additives on crystallization is further illustrated in the Figure, wherein crystallization half time is plotted against crystallization temperature. The crystallization half time, $t_1/2$, is defined as the time to reach the half completion of crystallization at the specified isothermal crystallization temperature. The results show that the nucelating composition of this invention functions to shorten the crystallization time, in other words, to increase the crystallization rate. Similar results are obtained when sodium di(b-tert-butyl-phenyl)-phosphate is substituted for the dibenzylidene sorbitol.

Although the examples disclosed and/or exemplified are the preferred embodiments of this invention, variations or modifications apparent to one skilled in the art are intended to be within the scope of this invention.

What is claimed is:

1. A crystallizable polyolefin polymer composition comprising a polyolefin selected from the group consisting of linear low density polyethylene and copolymers of ethylene with at least one alpha-olefin containing 3 to 8 carbon atoms, about 0.1 to about 20% by weight of polypropylene and a nucleating compound selected from the group consiting of dibenzylidene sorbitol and a phenyl phosphate compound of the formula

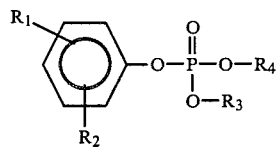

in which $R_1$ and $R_2$ are independently selected from the group consisting of a hydrogen atom, an alkyl group having 1 to 18 carbon atoms, an alkoxy group having 1 to 18 carbon atoms, a cycloalkyl group having 5 to 12 carbon atoms, a phenyl group, a phenoxy group, and a group

in which $R_5$ is a hydrogen atom or an alkyl group having 1 to 18 carbon atoms; $R_3$ is selected from the group consisting of an alkyl group having 1 to 18 carbon atoms,

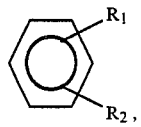

, and R₄; and R₄ is a hydrogen atom or a metal atom equivalent $M_{1/a}$ where a is the valence of the metal atom M, wherein said dibenzylidene sorbitol is present in an amount of about 0.05 to about 1.5% by weight and the phosphate compound is present in an amount of about 0.05 to about 2% by weight, all percentages being based on the weight of the total composition, said composition having a higher crystallization temperature and rate of crystallization than the composition containing only said olefin polymer or said olefin polymer containing only polypropylene or only said nucleating compound.

2. A polyolefin polymer composition according to claim 1, wherein said polypropylene is present in an amount of about 0.5 to about 5% by weight.

3. A polyolefin polymer composition according to claim 1, wherein said dibenzylidene sorbitol is present in an amount of 0.1 to about 0.5% by weight.

4. A polyolefin polymer composition according to claim 1, wherein said phosphate compound is present in an amount of 0.1 to about 1% by weight.

5. A polyolefin polymer composition according to claim 1, wherein said polypropylene is at least about 95% isotactic.

6. The composition of claim 1 in which said nucleating agent is dibenzylidene sorbitol and said polypropylene has a melt index of 1 to 25 and an isotactic content of at least about 95%.

7. The composition of claim 1 in which said phenyl phosphate is sodium di(p-tert-butylphenyl)phosphate.

8. The composition of claim 1 in which said polypropylene has a melt index of 1 to 25 and an isotactic content of at least about 95%.

9. The composition of claim 7 in which said polypropylene has a melt index of 1 to 25 and an isotactic content of at least about 95%.

* * * * *